United States Patent
Tang

(10) Patent No.: US 8,880,531 B2
(45) Date of Patent: *Nov. 4, 2014

(54) METHOD AND APPARATUS FOR IDENTIFYING A PIECE OF CONTENT

(75) Inventor: Harvey Tang, Sunnyvale, CA (US)

(73) Assignee: Samsung Information Systems America, Inc., San Jose, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/073,790

(22) Filed: Mar. 28, 2011

(65) Prior Publication Data

US 2011/0173206 A1 Jul. 14, 2011

Related U.S. Application Data

(63) Continuation of application No. 11/874,720, filed on Oct. 18, 2007, now Pat. No. 7,917,083.

(51) Int. Cl.
*G06F 17/30* (2006.01)
*H04M 1/725* (2006.01)

(52) U.S. Cl.
CPC ...... *H04M 1/72522* (2013.01); *H04M 1/72561* (2013.01); *H04M 2250/64* (2013.01); *H04M 1/72558* (2013.01); *G06F 17/3012* (2013.01); *H04M 1/72527* (2013.01); *G06F 17/30017* (2013.01); *H04M 1/7253* (2013.01)
USPC .......................................................... 707/741

(58) Field of Classification Search
CPC ............ G06F 11/1402; G06F 11/1451; G06F 11/1469
See application file for complete search history.

(56) References Cited

U.S. PATENT DOCUMENTS

| | | | |
|---|---|---|---|
| 7,206,820 B1 | 4/2007 | Rhoads et al. | |
| 7,756,892 B2 | 7/2010 | Levy | |
| 2002/0052885 A1 | 5/2002 | Levy | |
| 2003/0061305 A1* | 3/2003 | Copley et al. | 709/217 |
| 2003/0182254 A1 | 9/2003 | Plastina et al. | |
| 2003/0195852 A1* | 10/2003 | Campbell et al. | 705/51 |
| 2004/0025025 A1* | 2/2004 | Venkatesan et al. | 713/176 |
| 2005/0045373 A1* | 3/2005 | Born | 174/254 |
| 2005/0234860 A1 | 10/2005 | Roever et al. | |
| 2005/0234875 A1 | 10/2005 | Auerbach et al. | |
| 2005/0287971 A1* | 12/2005 | Christensen et al. | 455/186.1 |
| 2006/0161635 A1 | 7/2006 | Lamkin et al. | |
| 2006/0206582 A1* | 9/2006 | Finn | 709/217 |
| 2006/0282465 A1* | 12/2006 | Sharma | 707/104.1 |
| 2008/0052783 A1 | 2/2008 | Levy | |
| 2008/0097632 A1 | 4/2008 | Logan | |
| 2008/0177864 A1 | 7/2008 | Minborg et al. | |
| 2009/0249222 A1 | 10/2009 | Schmidt et al. | |

OTHER PUBLICATIONS

Sybase, Reference Manual: Building Blocks, Adaptive Server Enterprise 15.0, 2005, Sybase Inc, 183.*
PCT/US08/80205 International Search Report, dated Jan. 2, 2009.
PCT/US08/80205 Written Opinion, dated Jan. 2, 2009.

* cited by examiner

*Primary Examiner* — Dinku Gebresenbet
(74) *Attorney, Agent, or Firm* — Kenneth L. Sherman, Esq.; Michael Zarrabian, Esq.; Sherman & Zarrabian LLP

(57) ABSTRACT

A system and method for identifying a piece of content is disclosed. In one embodiment, an identifier for a piece of digital content can be generated using the title of the piece of digital content, the size of the piece of digital content, and a hash of other attributes of the piece of digital content such as title, album, and artist names.

23 Claims, 6 Drawing Sheets

METHOD AND APPARATUS FOR IDENTIFYING A PIECE OF CONTENT

PRIORITY CLAIM/RELATED APPLICATIONS

This application claims priority under 35 USC 120 and is a continuation of U.S. patent application Ser. No. 11/874,720 filed on Oct. 18, 2007 (now U.S. Pat. No. 7,917,083 issued on Mar. 29, 2011), and entitled "Method and Apparatus for Identifying a Piece of Content", the entirety of which is incorporated herein by reference.

FIELD

The invention relates generally to a method and apparatus for identifying a piece of content.

BACKGROUND

With the increase in storage capacity of hard disk drives and the prevalence of optical CD and DVD drives, users now can store their entire musical libraries on their personal computer (PC). For example, various software programs such as iTunes (offered by Apple Computer) allow a user to load musical content from CDs, store it on the computer's hard disk drive, organize the different content, and then play the music on the PC or burn all or part of the musical collection onto a CD or DVD. Users also can transfer the musical files to other devices, such as an iPod (offered by Apple Computer) or an MP3 player. These transfers typically require a direct, hardwired connection between the PC and the device, such as through a USB cable.

In recent years, mobile handsets (such as cellular phones and PDAs) have evolved beyond mere telephone and data collection devices. For example, many cellular phones now have sophisticated display screens and audio capabilities. Various companies (including mSpot, Inc., the assignee of this application), offer audio and video content that is "streamed" to the cellular phone using a wireless cellular network. This allows cellular phone users to listen to music or other audio content and watch movies or other video content on their cellular phones. However, the user's choices are limited to the content offered by the provider.

The proliferation of various types of digital content (files, music, text files, blogs, video files, etc.) has made the process of identifying each piece of content more difficult and thus there is a need for a system and method to identify each piece of content.

DETAILED DESCRIPTION OF EXEMPLARY EMBODIMENTS

The system and method are particularly applicable to a system and method for identifying a piece of digital music and it is in this context that the system and method are described. It will be appreciated, however, that the system and method has greater utility since the system and method can be used to identify any type of digital content and is not limited to the implementation described below to identify digital music content. Prior to describing the content identification system in detail, a system for allowing the transfer of digital content that may implement the content identification method and/or use the content identifier system is described.

Figure 1:
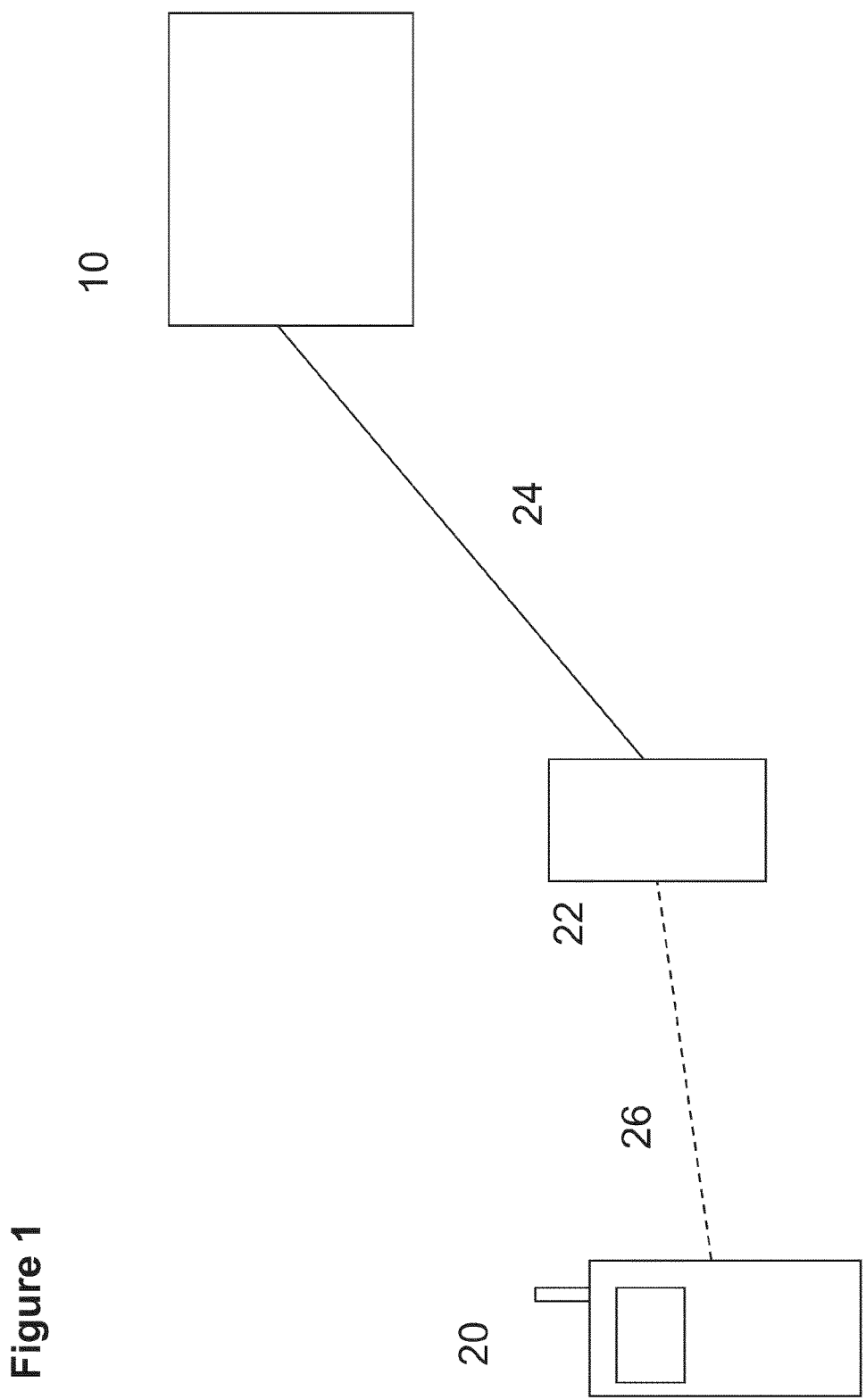
FIG. 1 illustrates a system that allows a mobile handset to download music from a PC using a wireless network and the Internet that may incorporate a content identification system.
Figure 2:
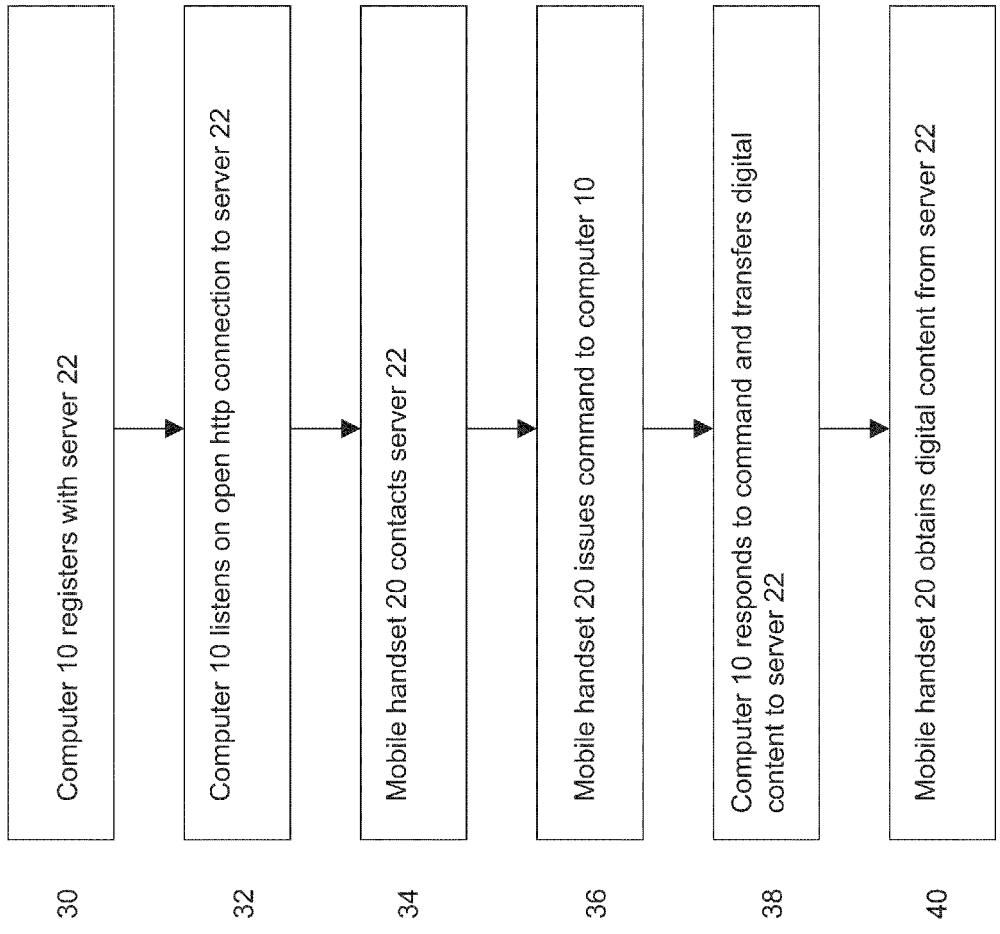
FIG. 2 is a flowchart showing a method for downloading music from a PC to a mobile handset using the system shown in FIG. 1.

FIG. 1 depicts a system that allows a mobile handset to download digital content from a computer using a wireless network. As in the prior art, a user stores digital content (such as music, video, etc.) on computer 10. However, in this embodiment, the user downloads the digital data from computer 10 to mobile handset 20 in a wireless fashion over a wireless communication path. Mobile handset 20 may be a PDA, mobile phone, wireless email device (such as the Blackberry), or other handheld device that has wireless connectivity to be able to communicate with the computer 10 and download digital content from the computer 10. Computer 10 communicates with a device 22, such as a server computer, over network 24. Network 24 can be any type of network, such as the Internet, and can be hardwired, wireless, or some combination of the two. Computer 10 runs a software application that allows a user to catalog and organize the digital content of the user. The device 22 can be accessible over the Internet (such as through a URL address). The device 22 is shown in FIG. 2 as a single device. However, it is to be understood that the device 22 can instead comprise multiple devices, such as multiple servers.

Mobile handset 20 connects to device 22 over a wireless network 26. Wireless network 26 can be a cellular telephone network, a WiFi network (such as an 802.11 network), a wireless data network (such as EV-DO or EDGE), or any other wireless network. It is to be understood that wireless network 26 need not connect directly to server device 22, but instead can connect through an indirect means such as by the Internet or through another network. The embodiment will be further described with reference to FIG. 2.

FIG. 2 is a flowchart depicting the interaction of the various elements shown in FIG. 1. Computer 10 connects to device 22 over network 24. Computer 10 then registers with device 22 (30) so that device 22 associates the digital content in the computer 10 with a particular user and a particular mobile handset. Computer 10 then listens on an open http connection to device 22 (32) and waits for communications from server device 22. Mobile handset 20 contacts server device 22 (34) over wireless network 26. Once the computer 10 is registered with the device 22, the user of the mobile handset, when the handset is turned on, sees the digital content actually stored on the mobile handset as well as the digital content stored in the computer 10 in a single display as shown in more detail in FIG. 4. When the user of the mobile handset wants to use a piece of digital content stored on the computer 10, the mobile handset 20 issues a command to computer 10 (36), such as a command to transfer a certain piece of digital content. Computer 10 responds to the command and transfers the digital content to device 22 (38). Mobile handset 20 then obtains digital content from device 22 (step 40). Thus, mobile handset 20 is able to obtain digital content (such as a music file) from computer 10 in a fashion that is at least partly wireless. Using the above system and method, a user may have digital content stored on his/her computer as well as on the mobile handset and may synchronize the digital content between the computer and the mobile handset in a wireless manner. For example, the system permits a user to have a much larger digital content catalog available for use than can be stored in the mobile handset. In addition, the system permits the user to download particular digital content at any time, such as downloading a particular movie before a long airplane flight. The user also can download additional data associated with the digital content, such as metadata (artist information, duration, title, etc.), cover art, and other data.

Figure 3:
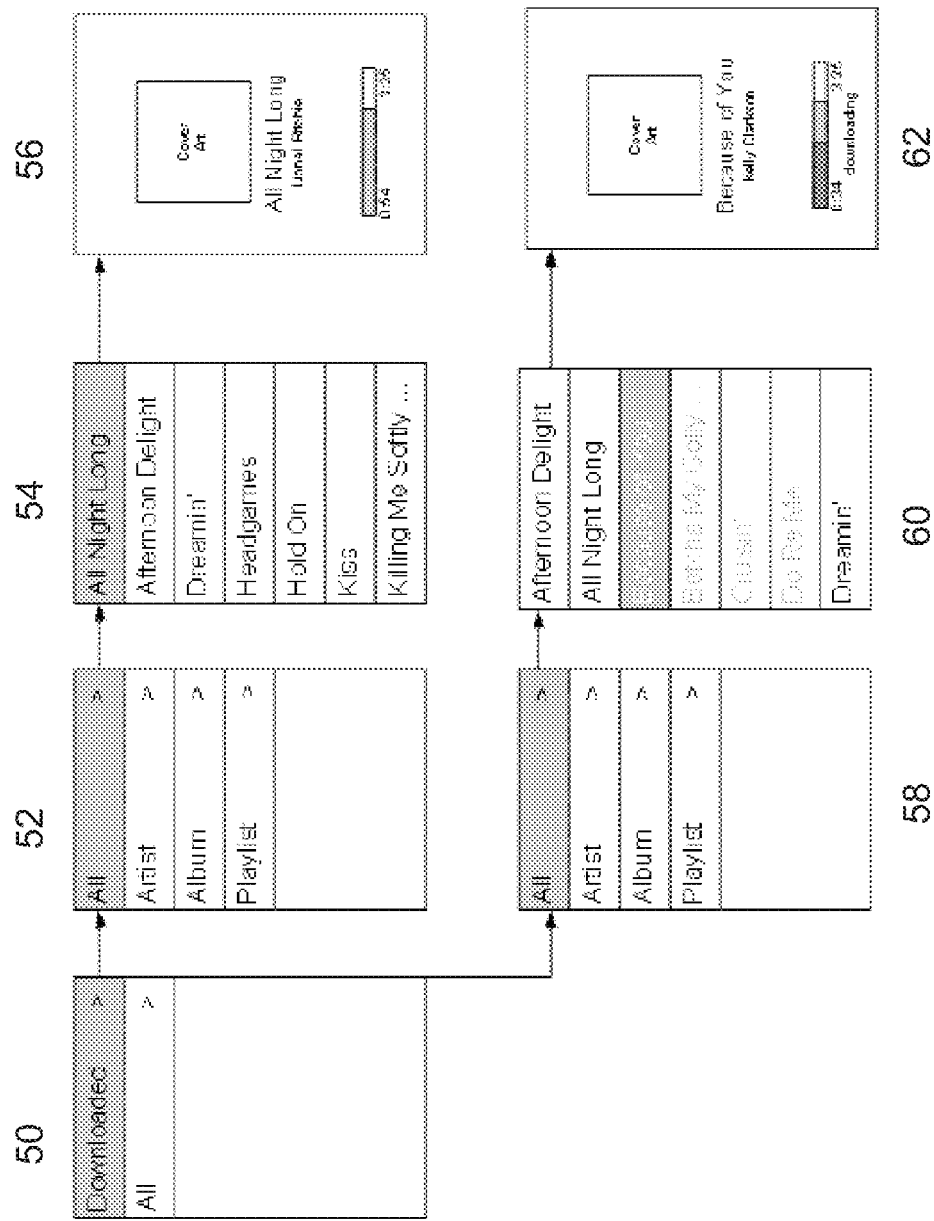
FIG. 3 shows an example of a user interface on the mobile handset for downloading music from a PC to the mobile handset.

FIG. 3 shows an embodiment of a user interface for mobile handset 20 once the computer 10 is registered with the device 22. FIG. 3 shows a number of different screens that might be displayed on mobile handset 20. These screens are generated by a software application running on mobile handset 20. The software application on the mobile handset obtains (when the digital content is not already stored in the mobile handset), organizes, displays (both digital content on the mobile handset and the computer 10), stores and plays digital content and can generate the user interface described below.

Screen 50 provides the user with two choices—to view a list of files that have been downloaded from computer 10 ("Downloaded") and are stored on the mobile handset, or to view a list of all files ("All") including the digital content stored on the mobile handset and the digital content stored on the computer 10. If the user selects the "Downloaded" option, then in screen 52, the user can then choose a subset of the files (by artist, album, or playlist) or to view all of them. If the user selects "All," then mobile handset 20 displays all available music files, including files that have been or can be downloaded from computer 10. In this embodiment, song titles in normal, black text already have been downloaded to mobile handset 20, and song titles in gray text have not yet been downloaded but can be downloaded. In Screen 54, the user selects the song "All Night Long," which already has been downloaded, and in Screen 56, the song plays on mobile handset 20 while cover art and other relevant information is displayed for the song "All Night Long."

When the user selects the "All" option in screen 50, the user is presented with a menu (58) that permits the user with options to view all of the digital content (both stored on the mobile handset and stored on the computer) including "All", by Artist, by Album and/or by Playlist. When the user selects to view all of the digital content (which are songs in this example), a screen 60 shows all of the digital content (both on the mobile handset and on the computer) wherein certain pieces of digital content are shown in gray text indicating that those pieces of digital content are stored on the computer and are available for download to the mobile handset and other pieces of digital content are shown in black indicating that those pieces of digital content are stored on the mobile handset. If the user selects "Because of You" (which is shown in gray text), mobile handset 20 then issues a command to computer 10 (36), such as a command to transfer the song "Because of You" from the computer to the mobile handset. Computer 10 responds to the command and transfers the requested digital content to server device 22 (38) and the mobile handset 20 then obtains the digital content from server device 22 (40). Once the piece of digital content (or at least a buffer full of the piece of digital content as the piece of digital content continues to download in the background) is downloaded to the mobile handset, screen 62 then shows the cover art and other relevant information for the song "Because of You" as the song is being played. When the digital content is downloaded onto mobile handset 20, it is played on mobile handset 20 and is also stored in a storage system within mobile handset 20 (such as on Flash RAM chip or disk drive) while it is being played. The digital content (a song in the example in FIG. 3) is thus added to the music collection stored on mobile handset 20. When that song is displayed in a menu in the future, it will be displayed in normal, black text rather than gray text since it has now been downloaded and stored on mobile handset 20.

In this manner, the digital content on mobile handset 20 can be synchronized with the digital content on computer 10 in a wireless fashion. This allows a user to listen to or watch the digital content that is stored on computer 10, even when the user is in a location remote from the computer 10.

Device 22 can implement security or verification measures to ensure that the person operating mobile handset 20 is the same person who owns computer 10, for copyright protection and other reasons. For example, device 22 can require that computer 10, when the computer registers with the device 22, provide device 22 with the phone number and PIN for the mobile handset that will be allowed to access the digital content stored on computer 10. When mobile handset 20 then contacts device 22 with a request to obtain data from computer 10, device 22 can then determine if the phone number associated with mobile handset 20 is the same phone number that previously had been registered by computer 10. Device 22 can be designed to proceed with the requested transfer only if the two phone numbers match. Other security or verification measures can be implemented, and this example is only illustrative.

Mobile handset 20 may include circuitry for running an operating system and applications, circuitry for processing data and metadata, and circuitry for rendering and playing the digital content, such as audio content and video content. All of the circuitry can be contained in a single integrated chip, in multiple integrated chips, or in a combination of some number of integrated chips and other electronic components.

A user of mobile handset 20 can run various applications on the handset, such as an application that enables the user to listen to music or to watch video content. Mobile handset 20 can include a video display and a speaker, which would enable a user of mobile handset 20 to watch video content on the video display and listen to audio content through the speaker.

Figure 4:
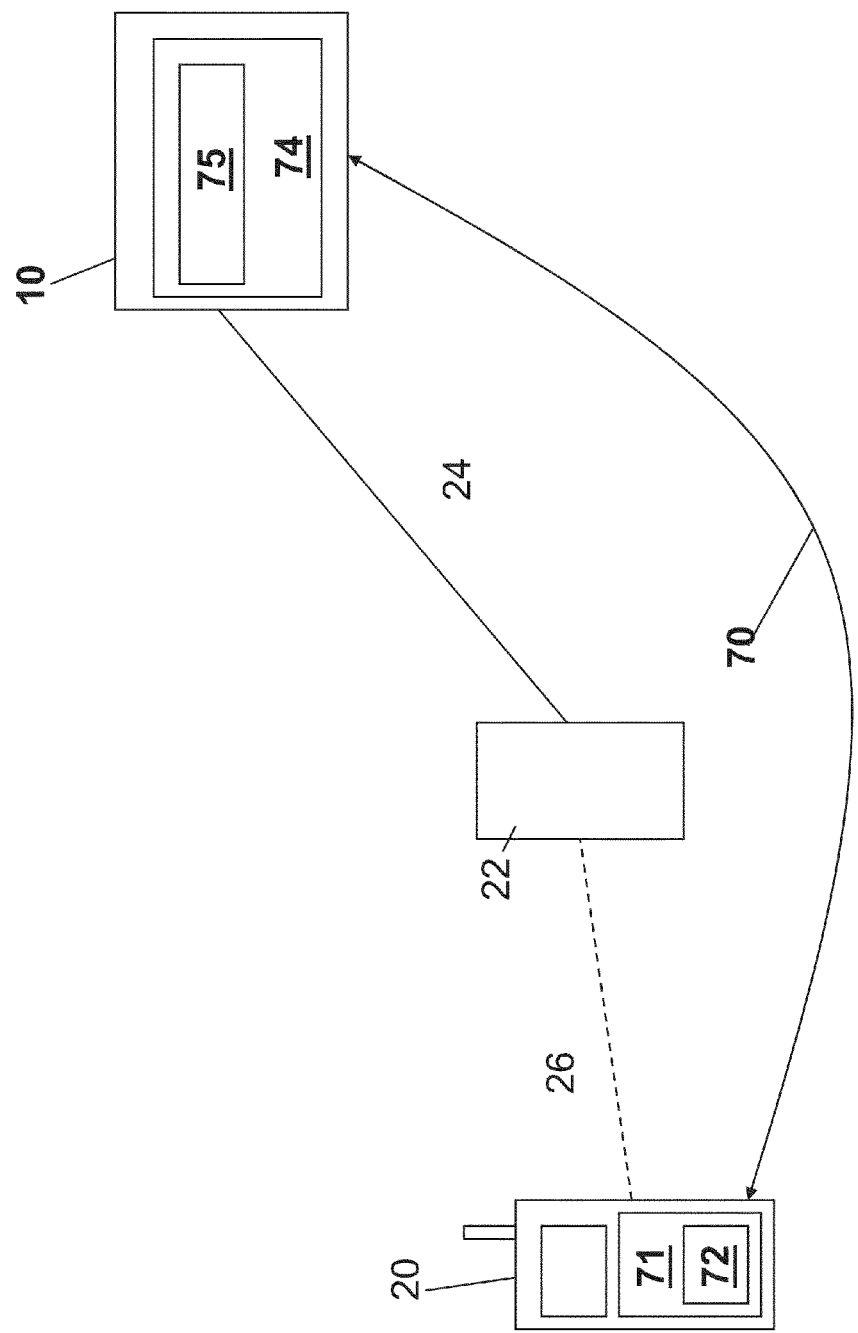
FIG. 4 illustrates another embodiment of the system that allows a mobile handset to share content with a computing device that may incorporate a content identification system.

FIG. 4 illustrates another embodiment of the system that allows a mobile handset 20 to share content with a computing device 10. In this embodiment, the mobile handset 20 can share content with the computing device 10 through the device 22 (as described above), but may also share content/synchronize content with the computing device 10 over a link 70, such as a cable, a docking station, by removing a memory card from the mobile handset 20 and reading the memory card using a memory card reading device coupled to the computing device 10 or by other wireless protocols such as a Bluetooth network. In this embodiment, the synchronization of the content over the two different methods (through the device 22 and over the link) requires that the system tracks the synchronization by both methods. The system may also permit multiple computing devices and multiple handsets (assuming that the user has the proper authorizations to share the content) to share the content. Additionally, the system also permits duplicate within the system to be identified due to the unique content identifier.

The mobile handset may include a content store 71, such as a database, that may include one or more playlists 72 and the computing device 10 may a content store 74, such as a database, and one or more pieces of content 75. In the computing device 10, the one or more pieces of content may have a plurality of different formats (such as MP3, AAC, ACC+, m4a for music content) and the system may be used with multiple different types of content including music content, photo content, file content, video content, podcasts and any other type of digital content. The computing device, using the content store 74, identifies any new content files so that those new content files can appear in the user interface of the mobile handset described above and new files downloaded directed to the mobile handset appear in the master content store maintained on the computing device 10. The content store 71 on each mobile handset may include an identification code (ID) so that the computing device 10 may contain a plurality of content stores for a plurality of mobile handsets wherein the content stores for each mobile handset are distinguished by the identification code. A user can also create a new playlist on the mobile handset that is stored in the content store 71 and then is synchronized back to the computing device 10 so that the computing device also maintains the playlists for the particular mobile handset in the content store for that particular mobile handset as identified by the identification code. Now, a content identifier generation system and method that can be used with the content systems described above is described in more detail.

Figure 5:
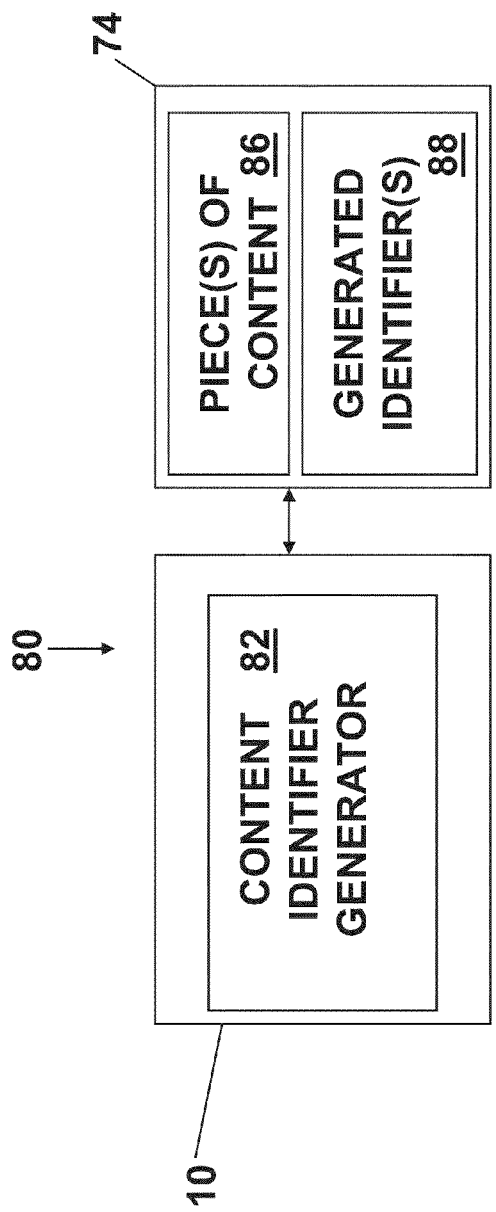
FIG. 5 illustrates an example of an implementation of a content identifier generation system.

FIG. 5 illustrates an example of an implementation of a content identifier generation system. In this implementation, the content identifier generation system is located in the computer 10 and the content store 74 as shown in FIG. 4. However, the content identifier generation system can also be implemented as a stand-alone system or integrated into other content systems. The content identifier generation system may comprise a content identifier generator 82, that may be implemented as a plurality of lines of computer code being executed by a processor of the computer 10 but may also be implemented in hardware or software or a combination thereof as the content identifier generator is not limited to any particular implementation, and a content store that may be stored in the content store 74 shown in FIG. 4 or in its own storage unit/device. The content store may include one or more pieces of content 86 as well as one or more generated identifiers 88 wherein each identifier is associated with a particular piece of content and can be used to uniquely identify the piece of content. The content identifier system may also used to generate an identifier for any type of digital content, such as music, videos, text files, blogs, etc, wherein the identifier for any specific piece of content is unique and deterministic (the same identifier is generated each time for the same particular piece of content).

In the content systems described above, the content identifier generation system permits the songs on the computer 10 to be identified. The content identifier generator allows the owner of the songs on the computer to maintain the song identifiers (or regenerate them is necessary) if a reinstall of the content application on the computer 10 occurs at any time. The system also allows the user to move the songs around on the computer 10 without affecting the validity of the identifiers and allows the user to share songs with other users or synchronize the songs with a mobile device 20 as shown in FIG. 4. In the system shown in FIG. 4, the song identifiers may be used to generate the index on the computer 10 and on the mobile device 10 (as described above) and maintain the validity of the song identifiers across the system. Now, an example of a technique for generating the identifier is described in more detail.

Figure 6:
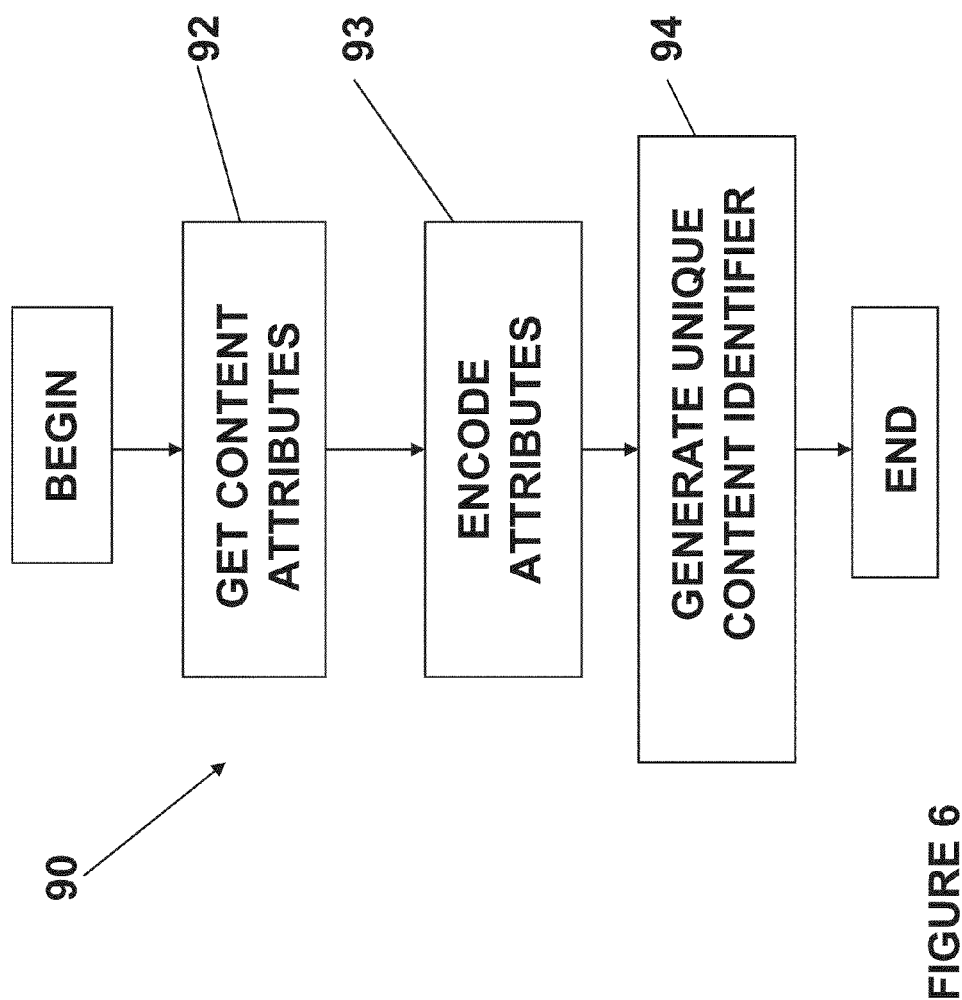
FIG. 6 illustrates a method for content identification.

FIG. 6 illustrates a method 90 for content identification for a particular piece of content. For purposes of illustration, the content identification method is described with reference to music content, but it is understood that the method can be used to generate identifiers for various different piece of content and types of content. In the method, a set of attributes of a particular piece of content is gathered (92) by a gathering unit that is part of the content identifier generator and is implemented as one or more lines of computer code. For example, for a piece of digital music, the attributes may include metadata contained in an MP3 ID3 tag or atoms in an MP4 or m4a file, the title of the song (in the MP3 ID3 tag), the album associated with the song (in the MP3 ID3 tag), the artist of the song (in the MP3 ID3 tag) and/or the size of the particular music file that can be obtained from the operating system of the computer on which the music file is stored. The size of the particular piece of content allows the system to differentiate between different version of a piece of content such as a live version and non-live version of a song. Once the attributes for the particular piece of music are obtained, the attributes are encoded into an identifier (94) by an encoding unit that is part of the content identifier generator and is implemented as one or more lines of computer code. In one embodiment, a hash function is performed on the set of attributes. Once the attributes are encoded, the unique content identifier may be generated (94) by a generation unit that is part of the content identifier generator and is implemented as one or more lines of computer code.

Figure 7:
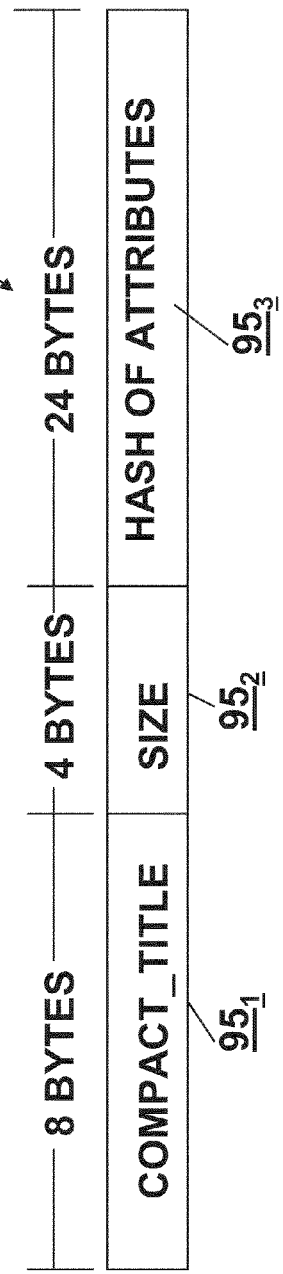
FIG. 7 illustrates an example of a content identifier generated by the content identifier generation system.

FIG. 7 illustrates an example of a content identifier 95 generated by the content identifier generation system. As shown, the content identifier may include a compact title portion $95_1$ (that contains a shortened version of the title of the content which is no longer than 8 bytes long), a size portion $95_2$ (that contains the size of the particular content file that may be up to 4 bytes long) and a hash portion $95_3$ (that contains a hash of the title, album and artist attributes and may be 24 bytes long). In one embodiment, the compact title portion may be generated by using the first eight alphanumeric characters of the title of the content (excluding spaces), but can also be generated is other ways that are within the scope of the system. Thus, in one embodiment, each identifier is 36 bytes long and permits unique (90% or more) identification of each piece of content and deterministic identification so that the identifier can be regenerated at any time.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A content system, comprising:
 a computer comprising:
  a content store for storing a piece of content; and
  a content identifier generator, wherein the content identifier generator comprises:
   a gathering unit that gathers two or more attributes for a piece of content, wherein one of the two or more attributes is a size of the piece of content; and
   a generator unit that generates a deterministic identifier for the piece of content based on the two or more attributes, wherein the deterministic identifier comprises the size of the piece of content and a hash value of at least one of the two or more attributes, wherein the same deterministic identifier is generated each time the generator unit generates a deterministic identifier for the piece of content, and wherein validity of the deterministic identifier is independent of the physical location of the piece of content;
wherein the computer includes a hardware processor.

2. The system of claim 1, wherein:
the piece of content is movable on the computer without affecting the validity of the deterministic identifier;
the content system further comprises an index maintaining deterministic identifiers generated by the generator unit;
the two or more attributes further comprises a title of the piece of content; and
the deterministic identifier further comprises a version of the title of the piece of content.

3. The system of claim 1, wherein:
the piece of content comprises a digital song; and
the two or more attributes further comprises one or more of a title of the digital song, an artist of the digital song, and an album associated with the digital song;
wherein the deterministic identifier further comprises a version of the title of the digital song, and wherein the version of the title of the digital song includes only a portion of alphanumeric characters included in the title of the digital song, such that the version of the title of the digital song is shorter than the title of the digital song.

4. The system of claim 1, wherein:
the piece of content comprises a digital video; and
the two or more attributes further comprises one or more of a title of the digital video, an artist of the digital video, and an album associated with the digital video;
wherein the deterministic identifier further comprises a version of the title of the digital video, and wherein the version of the title of the digital video includes only a portion of alphanumeric characters included in the title of the digital video, such that the version of the title of the digital video is shorter than the title of the digital video.

5. The system of claim 1, wherein the deterministic identifier is 36 bytes long.

6. The system of claim 1, wherein at least one of the two or more attributes is located in metadata associated with the piece of content.

7. The system of claim 6, wherein the metadata further comprises an MP3 ID3 tag.

8. The system of claim 1, wherein:
the content store stores different types of digital content; and
the content identifier generator is further configured to generate deterministic identifiers for different types of digital content.

9. The system of claim 1, further comprising:
a mobile device;
wherein deterministic identifiers generated by the generator unit are maintained in a first index on the computer and a second index on the mobile device;
wherein the validity of the deterministic identifiers are maintained across each index of the system; and
wherein the content identifier generator encodes the two or more attributes for the piece of content.

10. A method for generating an identifier for a piece of content, comprising:
gathering, by a content identifier generator, two or more attributes for a piece of content, wherein one of the two or more attributes is a size of the piece of content; and
generating, by the content identifier generator, a deterministic identifier for the piece of content based on the two or more attributes, wherein the deterministic identifier comprises the size of the piece of content and a hash value of at least one of the two or more attributes, and wherein the same deterministic identifier is generated each time the generator unit generates a deterministic identifier for the piece of content;
wherein the content identifier generator resides on a computer that includes a hardware processor, and wherein validity of the deterministic identifier is independent of the physical location of the piece of content.

11. The method of claim 10, wherein:
the piece of content is movable on the computer without affecting the validity of the deterministic identifier;
the computer further comprises an index maintaining deterministic identifiers generated by the content identifier generator;
the two or more attributes further comprises a title of the piece of content; and
the deterministic identifier further comprises a version of the title of the piece of content.

12. The method of claim 10, wherein:
the piece of content comprises a digital song; and
the two or more attributes further comprises one or more of a title of the digital song, an artist of the digital song, and an album associated with the digital song;
wherein the deterministic identifier further comprises a version of the title of the digital song, and wherein the version of the title of the digital song includes only a portion of alphanumeric characters included in the title of the digital song, such that the version of the title of the digital song is shorter than the title of the digital song.

13. The method of claim 10, wherein:
the piece of content comprises a digital video; and
the two or more attributes further comprises one or more of a title of the digital video, an artist of the digital video, and an album associated with the digital video;
wherein the deterministic identifier further comprises a version of the title of the digital video, and wherein the version of the title of the digital video includes only a portion of alphanumeric characters included in the title of the digital video, such that the version of the title of the digital video is shorter than the title of the digital video.

14. The method of claim 10, wherein the deterministic identifier is 36 bytes long.

15. The method of claim 10, wherein at least one of the two or more attributes is located in metadata associated with the piece of content.

16. The method of claim 15, wherein the metadata further comprises an MP3 ID3 tag.

17. The method of claim 12, wherein:
the content identifier generator generates deterministic identifiers for different types of digital content.

18. The method of claim 10, wherein:
deterministic identifiers generated by the content identifier generator are maintained in a first index on the computer and a second index on a mobile device;
the validity of the deterministic identifiers are maintained across each index; and
the content identifier generator encodes the two or more attributes for the piece of content.

19. A content system, comprising:
a content store for storing one or more pieces of content and one or more unique deterministic content identifiers, wherein each unique deterministic content identifier corresponds to a piece of content; and
a content identifier generator that generates a corresponding unique deterministic content identifier for each piece of content based on two or more attributes for the piece of content, wherein the same unique deterministic content identifier is generated each time the content identifier generator generates a unique deterministic content identifier for the piece of content;

wherein each unique deterministic content identifier corresponding to a piece of content comprises a size of the piece of content and a hash value of at least one attribute of the piece of content;

wherein the content store resides on a computer that includes a hardware processor; and wherein validity of the deterministic identifier is independent of the physical location of the piece of content.

20. The system of claim 19, wherein:

each piece of content further comprises one of a digital song and a digital video.

21. The system of claim 20, wherein:

for a piece of content comprising a digital song, attributes for the piece of content comprises one or more of a title of the digital song, an artist of the digital song, and an album associated with the digital song, wherein a unique deterministic content identifier corresponding to the piece of content further comprises a version of the title of the digital song, and wherein the version of the title of the digital song includes only a portion of alphanumeric characters included in the title of the digital song, such that the version of the title of the digital song is shorter than the title of the digital song.

22. The system of claim 20, wherein:

for a piece of content comprising a digital video, attributes for the piece of content comprises one or more of a title of the digital video, an artist of the digital video, and an album associated with the digital video, wherein a unique deterministic content identifier corresponding to the piece of content further comprises a version of the title of the digital video, and wherein the version of the title of the digital video includes only a portion of alphanumeric characters included in the title of the digital video, such that the version of the title of the digital video is shorter than the title of the digital video.

23. The system of claim 19, wherein:

each unique deterministic content identifier is 36 bytes long;

the content store stores different types of digital content; and attributes for each piece of content are encoded.

* * * * *